No. 800,640. PATENTED OCT. 3, 1905.
H. GILARDONI & H. LE RICHE.
ELASTIC TIRE FOR VEHICLE WHEELS.
APPLICATION FILED MAR. 16, 1905.

WITNESSES:
Fred White
René Nuine

INVENTORS:
Henri Gilardoni and
Henri Le Riche,
By their Attorneys
Arthur E. Fraser & Co.

UNITED STATES PATENT OFFICE.

HENRI GILARDONI AND HENRI LE RICHE, OF PARIS, FRANCE.

ELASTIC TIRE FOR VEHICLE-WHEELS.

No. 800,640.     Specification of Letters Patent.     Patented Oct. 3, 1905.

Application filed March 16, 1905. Serial No. 250,459.

*To all whom it may concern:*

Be it known that we, HENRI GILARDONI, residing at 25$^{bis}$ Rue Decamps, and HENRI LE RICHE, residing at 198 Rue de Courcelles, Paris, France, citizens of the Republic of France, have invented new and useful Improvements in Elastic Tires for the Wheels of Motor and other Carriages, of which the following is a specification.

This invention relates to a new kind of tire for carriage-wheels designed to replace the elastic tires at present in use, the said tire consisting, mainly, of a fabric of elastic wires or springs arranged transversely or as a weft and secured by longitudinal or warp threads. This tire is not liable to be dislodged by strains tangential to its outer surface; but nevertheless it allows a deformation normal to the said surface. This new tire, therefore, has a perfectly limited contour, the shape of which is alterable and reacts elastically against deformation. This surface is formed of a fabric or a kind of fabric the warp of which is formed of threads, strings, cords, or ribbons of textile materials, hemp, flax, silk, or other threads or even of wires and the weft of which is formed wholly or partially of elastic metal rods, which may be of any suitable section, such as round or flat, and single or assembled in clusters. The thickness of these elastic rods, which are designed to act as springs, and their number in the weft of the fabric may vary according to the resistance that the tire is required to offer to deformation and crushing. In order to apply a tire of this kind to the periphery of a wheel it must be capable of being hooked or fixed in a suitable manner to the edges of the rim of the wheel. A suitable means which gives good results consists of bending back all the elastic metal rods at their ends, so as to form lateral hooks on the tire in the flanges of the rim.

The details of this invention will be readily understood by reference to the accompanying drawings, which represent, by way of example, several modes of application as a tire for a carriage-wheel.

Figure 1:
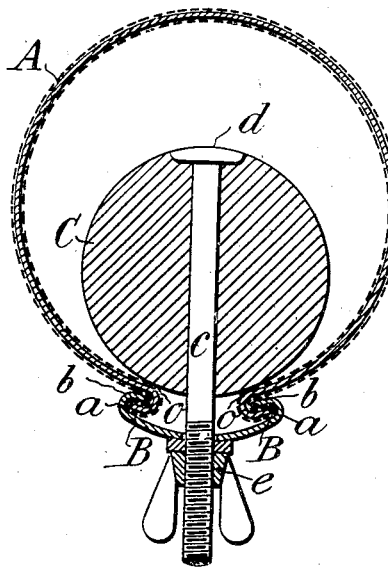
Figure 3:
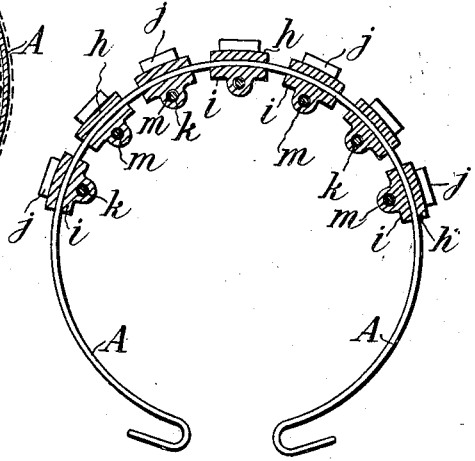
Figure 2:
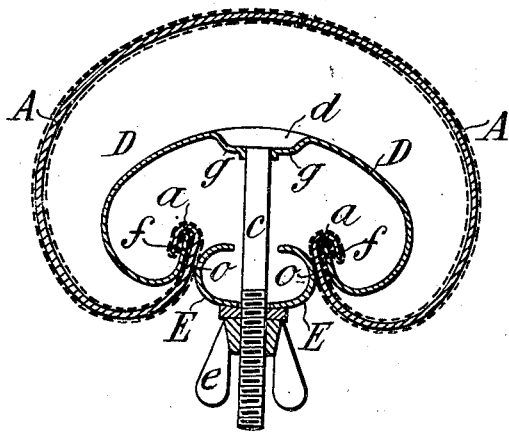
Figure 4:
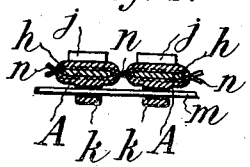
Figure 5:
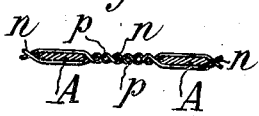

Figure 1 shows an elastic tire made according to the invention adapted to a metal wheel-rim of ordinary shape for carriages. Fig. 2 is a section of the rim of a carriage-wheel provided with the elastic tire; but the rim of the wheel is more particularly arranged to receive the said elastic metal tire. Fig. 3 is a transverse section of a wheel-tire made on the same principle, but suitable for trucks and other vehicles for heavy loads. Fig. 4 is a partial longitudinal section. Fig. 5 is a longitudinal section of a modification.

The tire for light carriages or ordinary motor-cars is made of a fabric A, the warp of which is arranged in the direction of the circumference of the wheel and is formed of threads, for example, of textile material, hemp, flax, &c., while the weft, which is arranged in the transverse direction of the rim, is formed of elastic wires associated or not with threads of textile material. Naturally the fabric is flat woven, and it is by the application of this fabric to the periphery of the rim of the wheel that the elastic wires take the curve which is shown by the transverse sections represented at Figs. 1 and 2. The metal rim B of the wheel being shaped as shown in Fig. 1, the ends of all the transverse elastic wires which enter into the composition of the fabric A are terminated by a hook $a$ to hook under the flanges $b$ of the rim. These hooks $a$ can be kept fixed to the rim in an unalterable manner in any suitable way— for example, by means of wedges of wood, metal, or other material, the shape of which follows the profile of the rim and which are fixed to the latter by means of bolts secured by nuts in the interior of the rim. It will be seen by reference to Fig. 1 that the hooked ends $a$ of the elastic-metal rods are kept properly in place by a wooden ring C, which bears on the interior of the rim of the wheel, pressing the edges of the fabric against the hooks $b$. The inner ring C is firmly pressed onto the rim by bolts $c$, the head $d$ of which is embedded in the inner ring C and the stem of which passes through the metal rim B and receives a tightening-nut $e$ on the inner side.

It will be understood that the inner ring C, which keeps the elastic tire fixed on the rim of the wheel, as just explained, serves at the same time as a final stop upon which the tire or cover bears at the tread in case of any undue flattening of the tire owing to accidental overloading or an unforeseen circumstance. If required, this inner wooden ring C can be covered either over its entire periphery or only on the outermost portion with a band of leather, india-rubber, felt, or other soft material.

In the example illustrated in Fig. 2 the tire of the wheel, made of metal, has a peculiar conformation, such that the inward bellying D fulfils the same purpose as the ring C as regards limiting the deflection of the elastic rods forming the springs which enter into the composition of the fabric forming the tire. On the other hand, the backwardly-bent inner portions $f$ allow of hooking the bent ends of the elastic metal rods of the fabric, as shown at $a$. It will be observed that the hooks in this second arrangement are arranged in a reverse direction to that shown in the arrangement illustrated in Fig. 1. In order that the edges of the tire may be firmly applied against the inner bent parts $f$ of the said rim, Fig. 2, an inner counter-rim E is provided, which is connected to the inner rim by bolts $c$. The metal rim D is provided at intervals with recesses $g$ for receiving the heads $d$ of the bolts, which are tightened by the nuts $e$. The spokes of the wheel are fixed to the counter-rim E.

Tires of elastic fabric having transverse metal rods forming springs can even be applied to wooden wheels by suiting them for the mounting and hooking of the edges.

In order that the ends of the elastic metal rods may be formed into hooks, as already explained, so that the edges of the tire may hook under the flanges of the metal rim of the wheel or under flanges with hooks applied to a wooden rim, it is advisable that the ends should not be tempered; but these metal rods are tempered in order to possess as much elasticity as possible, starting from the points of contact of $b$ and C in Fig. 1, which points are indicated in the drawing by the letter $o$, and in Fig. 2 starting from the points of contact E and $f$ and which are also indicated by the letter $o$.

When the metal rods forming springs which enter into the composition of the fabric are bundled together on account of the weight they have to support necessitating it, it is advantageous to cover them with a suitably-secured winding of threads, strings, or ribbons before being placed in position in order that the said wires united in groups shall not in the course of time wear nor cut the warp-threads of the fabric.

The fabric constituting the tire, and which is formed as hereinbefore explained, can be employed as thus made. It is, however, preferable to impregnate it with india-rubber, gutta-percha, or other ductile and agglutinant cement. It is also advantageous to provide it outside with a protective covering designed to prevent it from wearing too quickly, the said protector being itself replaced when worn.

The hollow elastic band which constitutes the tire may also receive nails or riveted disks or studs. An arrangement of this kind is suitable for forming tires for wheels for transport-vehicles designed to be heavily laden. In this case (see Figs. 3 and 4) the tire is not composed of wires arranged in a transverse direction and forming the weft of the fabric, but of actual flat springs A of one or two millimeters in thickness and about ten millimeters (more or less) in width, the ends of which are bent back to hook into the flanges of the rim of the wheel, as already explained. On these spring-strips A are passed, like runners, metal stirrups $h$, which are firmly secured by hammering or otherwise at the points $i\ i$, so as to be firmly held against the spring-strip onto which these pieces have been run or threaded. On the outer side these pieces are in the form of circular or other shaped disks or studs $j$, which are designed to come into contact with the surface of the ground. On the inner side these pieces $h$ are formed with an eye $k$ to receive metal rods or wires $m$, which thus extend to the interior of the tire throughout the whole circumference. Their ends are united by ligatures or nuts engaged upon screw-threaded rods before the tire is applied to the rim. Textile or other threads $n$, passing alternately above and below the spring-strips A, complete the band or tire. These rods $n$ may consist of threads of textile material or metal rods, according to requirements.

Instead of arranging the transverse spring-strips A almost side by side, as shown in Fig. 4, they may be more or less separated from one another and the intervening spaces filled in with metal wires $p$ of small section, like those which are suitable for the tires of less resistance, (shown in Figs. 1 and 2,) and the strip completed by longitudinal warp-threads $n$—that is to say, threads which are arranged circumferentially of the wheel.

Having now particularly described and ascertained the nature of our said invention and in what manner the same is to be performed, we declare that what we claim is—

1. A wheel-tire with a warp of textile threads and a weft of elastic elements the ends of which are bent back in order that they may hook into the edges of the wheel-rim, in combination with a ring within the tire at the periphery of the wheel to serve as a stop for limiting the flattening of the tire when submitted to undue exterior pressure, the said stop constituting the rim itself, and a counter-rim serving in combination with the other rim to retain the hooked edges.

2. A tire for vehicle-wheels formed by warp-threads of textile or other material arranged circumferentially of the wheel, and by a weft, the elements of which are elastic metal designed to act as springs, said metal elements being surrounded by a binding of threads for preventing wear and the breakage of the textile warp-threads.

3. A tire for vehicle-wheels formed by warp-threads of textile or other material arranged circumferentially of the wheel, and by a weft, the elements of which are elastic metal designed to act as springs, the whole being impregnated with a ductile, agglutinant and impermeable cement.

4. A tire for vehicle-wheels formed by warp-threads of textile or other material arranged circumferentially of the wheel, and by a weft, the elements of which are elastic metal designed to act as springs, the whole being impregnated with a ductile, agglutinant and impermeable cement, in combination with an outer protective covering.

5. A tire for vehicle-wheels formed by warp-threads of textile or other material arranged circumferentially of the wheel, and by a weft, the elements of which are wide spring-strips, runners fixed on said strips and having outside disks or studs and inside eyes, and longitudinal rods in said eyes extending in the direction of the circumference within the covering.

6. A tire for vehicle-wheels formed by warp-threads of textile or other material arranged circumferentially of the wheel, and by a weft, the elements of which are wide spring-strips, runners fixed on said strips and having outside disks or studs and inside eyes, and longitudinal rods in said eyes extending in the direction of the circumference within the covering, said runners being separated by elastic wires of reduced section connected to the whole by the warp-threads.

In witness whereof we have hereunto signed our names, this 2nd day of March, 1905, in the presence of two subscribing witnesses.

HENRI GILARDONI.
HENRI LE RICHE.

Witnesses:
JULES ARMENGAUD, Jeune,
MARCEL ARMENGAUD, Jeune.